United States Patent Office
3,465,244
Patented Sept. 2, 1969

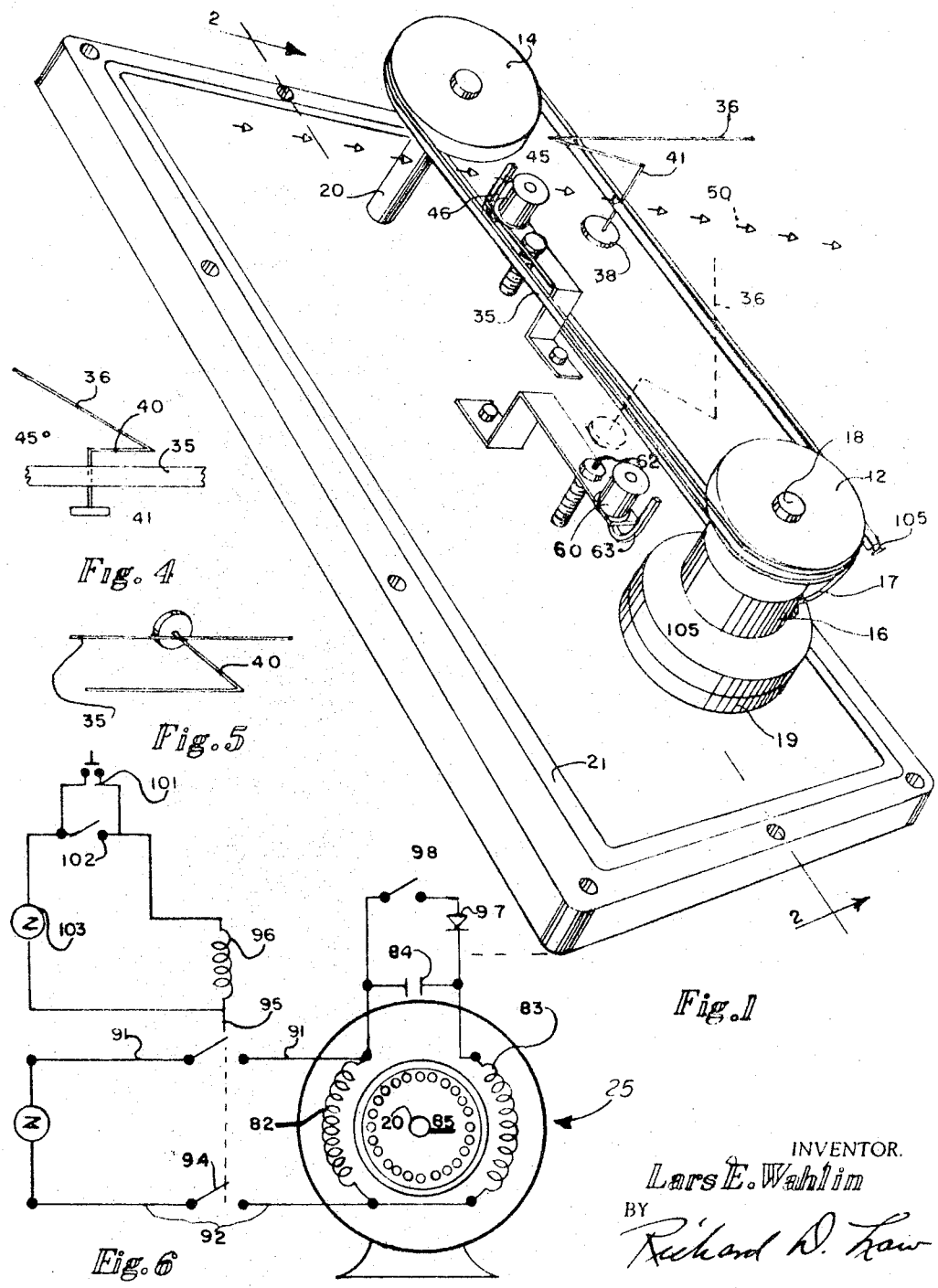

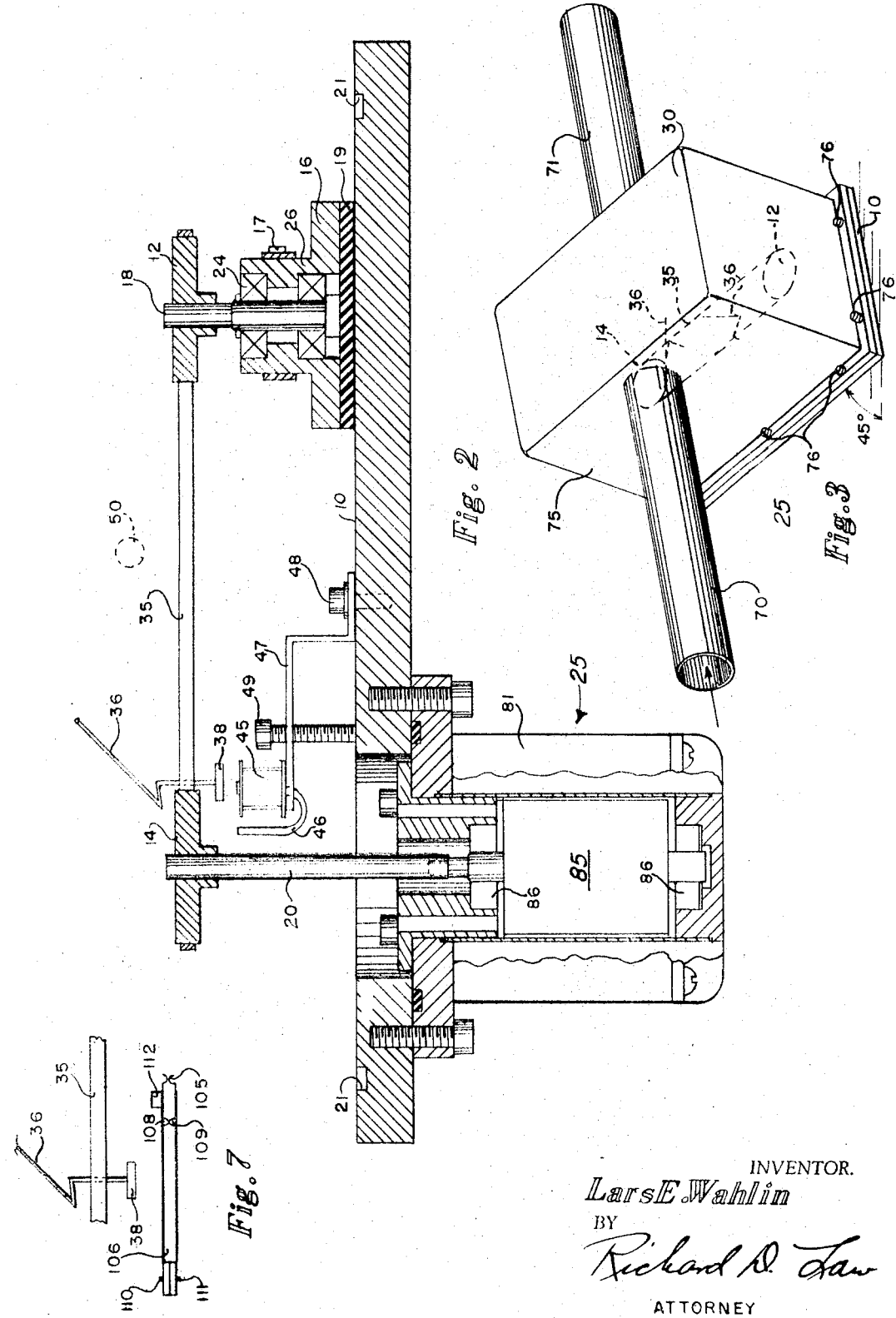

3,465,244
BEAM SCANNER FOR INDICATING THE DIMENSIONS AND CONFIGURATION OF A BEAM OF CHARGED PARTICLES
Lars E. Wahlin, Boulder, Colo., assignor to Colutron Corporation, Boulder, Colo., a corporation of Colorado
Filed June 6, 1966, Ser. No. 560,950
Int. Cl. G01n 27/62
U.S. Cl. 324—71
8 Claims

ABSTRACT OF THE DISCLOSURE

A charged particle beam scanner uses a single probe mounted on an endless belt and mounted at a 45° angle to the longitudinal axis of beam, and the probe is arranged at a 45° angle to the belt so that on one stretch of the belt it passes horizontally through the beam and on the other stretch of the belt it passes vertically through the beam. A pick off at the end of each pass through the beam, picks off the charge from the probe and alternately displays the charge on the X and Y axes of an oscilloscope, thereby visually showing the dimensions and configuration of the beam.

---

This invention relates to a beam scanner and more particularly to an X and Y axes beam scanner for determining the dimension of the configuration of a beam through which the scanner passes.

This invention provides means for linear scanning of the horizontal and vertical axes of an electron, neutron, proton or the like, beam by means of a single probe passing through the beam. The device is arranged so that the probe periodically passes through the beam path to scan the beam on both the X and Y axes and transmit pickup signals to an oscilloscope or similar type of instrument for determining the approximate size and shape of the beam either by visually displaying the signals, from which an evaluation may be made of the shape and the size of the beam, or recording the signals or the like. The invention provides a probe on an endless member so that each complete revolution of the probe it passes through the beam twice, and according to the invention one pass scans the beam along the horizontal axis and on the other pass through the vertical axis. The probe of electrically conductive material repeatedly intercepts a charged beam, first horizontally then vertically, and an electric charge is picked up on the probe at a rate which is proportional to the beam current density integrated over the area of interception. A pick off for the probe after every pass through the beam, picks up the electrical charge from the probe, and these electrical impulses are alternately recorded on the vertical and horizontal axes of a recording device, such a dual trace oscilloscope thereby showing the dimensions and configuration of the beam.

The scanner is fully enclosed in the vacuum system of the beam supply and target whereby the beam may be contiunously scanned during operation. Also, there is provided a novel switching arrangement which stops the endless member at the same position each time with the probe out of the beam to prevent damage to the probe by the beam. For optimum scanning of the beam, the probe should pass through the beam a minimum of ten times a second, and the switching arrangement is arranged to slow the endless member down to provide a positive stop at a predetermined point out of contact with the beam.

Included among the objects and advantages of the invention is a scanner for a beam which, with a single probe, scans the X and Y axes of the beam.

Another object of the invention is to provide an endless member having a single probe which may be arranged to scan a beam by cutting the beam at predetermined intervals.

Another object of the invention is to provide a simplified means for reducing the speed of an electric motor for actuating a mechanical switch to stop the motor at a predetermined position.

Another object of the invention is to provide a totally enclosed beam scanner which may be placed in the housing for a beam between a beam source and target assembly.

These and other objects and advantages of the invention may be readily ascertained by referring to the following description and appended illustrations in which:

FIG. 1 is a perspective view of a beam scanner according to the invention;

FIG. 2 is a cross-sectional view of the scanner shown in FIG. 1, taken along section line 2—2;

FIG. 3 is a partially schematic perspective view of a housing for a scanner mounted in a beam tube, illustrating the positioning of the scanner for a beam;

FIG. 4 is a detail view of a mounting for a probe on an endless member of the scanner according to the invention;

FIG. 5 is a top plan view of the scanner probe of FIG. 4;

FIG. 6 is a circuit for the motor for driving the scanner with the means for slowing the motor down for a mechanical stop; and FIG. 7 is a partial detail view of a stop switch arrangement for the motor of the device.

In general the device of the invention includes an endless belt, chain or the like arranged around a pair of pulleys for rotating a probe attached thereto. The endless belt is set at a 45° angle to a substantially vertical plane through a substantially horizontal beam, and the probe is arranged at a 45° angle to the endless belt, whereby the probe on a downward sweep passes horizontally through the beam and on an upward sweep the probe passes in a vertical plane through the beam. A signal pickoff is arranged for conveying a signal from the probe during each upward and downward sweep, both of the signals being registered on an oscilloscope (or similar instrument) indicating the vertical and the horizontal components of the beam.

In the device illustrated in FIG. 1 a planar base member 10 is arranged at a 45° angle to the horizontal (when the beam is horizontal) and placed adjacent the beam path between a beam source and target. A pair of pulleys or sprockets 12 and 14 are mounted on shafts mounted perpendicular to the planar member 10. (Sprockets are merely a special configuration for an endless member which is a chain.) The pulley 12 is secured on a mounting 16 having an electrical brush-type signal pickoff 17 by means of a shaft 18 mounted in bearings 24 and 26, FIG. 2, in the mounting. The member 16 is insulated from the planar member 10 by means of an insulating washer 19 and is retained on the member 10 by nonconducting bolts (not shown). The pulley 14 is mounted on a shaft 20 which is rotated by an electric motor, shown in general by numeral 25. The motor 25 is completely enclosed and arranged to operate under high vacuum conditions. The member 10 is arranged with a peripheral groove 21 in which an O-ring seal fits (other suitable seal member) and when a cover 30, shown in FIG. 3, is secured thereon the endless members may be completely enclosed and operated in a very high vacuum. The pulley 12 is made of conducting material for a signal picked up from a probe, while the pulley 14 is preferably made of an insulating material such as nylon or the like to prevent signal transmitting from the metal and electrical components of the motor.

An endless member 35 is arranged around the pulleys 12 and 14 and a probe 36 is mounted thereon. The probe 36 is provided with a counter-balance 38 mounted below the endless member and is made of magnetic material. The probe is made of conducting material, such as stainless steel or the like. The belt 35 may be a chain, an electrically conducting tape, or the like, to provide transmission of electrical impulses picked up by the probe. Also, the mounting 16 may be spring based away from the other pulley mount to maintain a predetermined tension on the endless member. Where a chain is used, for example a stainless steel chain, the impulse is transmitted through the sprocket 12 of the pickoff 7. Where a Miler belt is used with an electric conducting material imprinted on the tape, the electric transmitting portion is connected to the probe and a pickup is mounted to contact the conducting material through a contact such as the brush 17.

The probe 36 is mounted on a cross member 40 which is parallel with a plane passing through both stretches of the endless member and is attached to a member 41 secured perpendicularly to the belt 35. The counter-balance is mounted on the member 41. The probe 36 is in electrical conducting contact with the endless member 35 since it is in contact with a second conductor of the signal input circuit to the oscilloscope. The counter-balance 38 is a magnetic material to shunt across the poles of the horseshoe magnet of a magnet pickup and complete that side of the circuit to the trigger input of the oscilloscope, as explained below. The probe 36 is mounted at a 45° angle to a plane passing through both flights of the belt. Thus, when the belt is placed at a 45° angle to a horizontal beam, the probe extends horizontally on one flight and vertically on the other flight, as shown in FIG. 1 in the solid lines and in dashed lines, respectively. Thus, the probe on each revolution around the belt will make two passes through a beam, illustrated in general by numeral 50, on the horizontal and on the vertical axis. The signals from each sweep are transmitted to the oscilloscope from which the X–Y components of the beam may be determined.

A magnetic pickup is mounted adjacent the beginning of each flight of the belt to provide a trigger pulse for the oscilloscope so that the sweep traces of the oscilloscope are synchronized with each flight of the belt. The magnetic pickoff includes a coil 45 and a horseshoe magnet 46 aranged adjacent the endless member so that the counter-balance 38, which is long enough to span the distance between the poles of the magnet, completes a magnetic circuit and the coil in turn transmits a trigger pulse, caused by magnetic induction, to the trigger input of the oscilloscope. Obviously, the brush 17 is in continuous contact with the signal input of the oscilloscope, while the pulse from the magnetic pickup is only transmitted when the counter-balance 38 spans the gap between the poles of the horeshoe magnet, closing the magnetic circuit momentarily as it passes over it. The rate of rotation of the belt to produce greater than 10 revolutions per second provides means for producing a substantially continuous image on the oscilloscope. The higher the rate of rotation the steadier is the signal on the oscilloscope.

The coil 45 is mounted on a bracket 47 secured to the base 10 by means of a bolt 48 and the height of the bracket is adjustable by means of an adjusting screw 49 which raises or lowers the pickup coil 45 in relation to the counter-balance 38. As stated above, there are two pickup coils, one is to trigger the horizontal scan, and the other coil to trigger the vertical scan. Coil 60 mounted on a bracket 61 is controlled by an adjusting screw 62 for adjusting the coil height in relation to the belt 35. The coil 60 is provided with a horseshoe magnet 63 in the manner described for the coil 45. The magetic pickup for each stretch is around the pulley from the stretch the probe has just left and before the probe starts along the next stretch. The pickup may be placed at a position following the passage of the probe through the beam and before it again passes the beam.

The scanner is arranged in a beam system, as illustrated in FIG. 3. A beam tube 70 extending from a source, not shown, to a target, not shown, is arranged with the scanner mounted on the end of the tube 70 and on the tube 71 which extends to the target. The base 10 is mounted at a 45° angle to the horizontal tube 70 and 71 so that the belt is at a 45° angle to the beam. The probe passes horizontally and vertically through on each pass as the endless member is rotated. A cover 75 is mounted over the base 10 completely enclosing the probe mechanism and bolt holes 76 provide mean for securing the cover to the base to provide for high vacuum operation, since beans to be scanned are generated in a very high vacuum system. All the electrical leads to the pickup, the motor and the like pass through hermeically sealed connections. to the outside for connection to a power source, the oscilloscope and the like. The two magnetic pickups trigger the two horizontal traces on a dual trace oscilloscope, one line being the X axis indicator and the other being a Y axis indicator. The extent of the signal on the oscilloscope from the probe indicates the relative dimension of the beam along the particular axis, thus the accurate demensions of the beam may be visually ascertained from the oscilloscope or other instrument.

The beam which is being scanned may be damaging to the probe if the probe is left in the beam for any period of time. It is, therefore, necessary to provide a means for stopping the probe at a point away from the beam when the scanner is not in operation, but the beam continues in operation. One control, shown in FIG. 6, includes an electric motor 25, herein illustrated as a single phase, capacitor-start, capacitor-run induction motor. The electric motor includes a stator 81 having a rain or running winding 82 and an auxiliary starting winding 83, both wound on the stator in conventional manner. A capacitor 84 is connected in series with the auxiliary winding for improved starting torque, as is known in the art. A rotor 85, preferably of the squirrel cage type, is supported for rotation within the space in the stator on bearings 86 and includes a rotary output shaft 20 on which is mounted a pulley or sprocket 41.

An electric power source 88, herein illustrated as an alternating current, and preferably of the commercial 115 volt alternating current single phase, is provided for the motor. The current from the source 88 is supplied across the main winding 82 and across the capacitor and starting winding 83 through the lines 91 and 92 to induce the voltage across the stator 83 leading to the rotor 86 and thereby bringing the motor up to full load speed. The full load speed is, of course, dependent on the number of poles in the stator and these may be any number from 2 on up, depending on the frequency in the power source, such power source being normally 60 cycles. Motors of various speeds may be used, depending on the use and the speed at which it is desired to pass the probe through the beam.

Normally open switches or controls 93 and 94, herein illustrated as a portion of a relay 95, are connected in lines 91 and 92, respectively, for selectively connecting the power source through the lines 91 and 92 to the windings 82 and 83, as hereinafter described. A conversion circuit inclusive of a rectifier element 97 and a normally open switch 98 is connected in series with the auxiliary winding or starting winding 83 and across the capacitor 84. When switch 98 is closed the power source is connected through the rectifier and is rectified or the current conducts through the winding 83 during only one-half of the AC cycle and blocks current during the other half cycle to provide an essentially DC field in the winding 83, which acts as a magnetic brake to slow down the rotor 86, thereby rotating the pulley 14 at a substantially reduced speed. The coil portion 96 of the relay 95 is energized through a normally open push button switch 101 and a normally open magnetic switch 102 by an AC power source 103.

The sequence of operation is as follows: push button switch 101 is closed to energize relay 95 to close contacts 93 and 94 and apply the current across the windings 82 and 83 to bring the rotor up to full load speed. Switch 98 is then closed to apply a rectified alternating current to the winding 83 which magnetically slows the rotor down to a second or predetermined reduced speed. The magnetic switch 102, which is closed when the motor comes up to full load speed, is opened after the rotor slows down to the reduced speed, after which the motor is stopped by means of a switch shown in FIG. 7. A normally closed leaf switch, shown in general by numeral 105, includes an upper leaf 106 and a lower leaf 107 which are spring-biased together to maintain contacts 108 and 109 normally closed. Leads 110 and 111 are placed in the power circuit from source 103 leading to the relay 95. A magnet 112 is secured to the upper leaf 106 and when the counter-balance 38 slowly passes over the leaf spring the magnet 112 is attracted and magnetically adheres to the counter-balance 38, and by maintaining the counter-balance a slight distance above the leaf spring, opening the contact 109, deenergizing the relay, thus stopping the motor. The motor, therefore, stops when the magnet 112 is in contact with the counter-balance 38, and the leaf switch is open and the relay deenergized. The leaf switch is placed adajcent one of the pulleys so that the probe is stopped near one of the pulleys out of the beam which passes approximately centerwise between the two pulleys and above the belt, as shown in FIG. 2. One position for the switch is shown in FIG. 1, indicating the stopping position for the probe is on the lower pulley 12; however, it may be stopped adjacent the upper pulley.

A single phase capacitor-start capacitor-run motor as illustrated herein is but a special case of a split phase induction motor. Obviously, this brake mechanism is useful for a conventional induction motor without the capacitor. By placing a rectifier in the starting winding circuit the impression of the DC current on the starting winding acts as a brake on a straight split phase induction motor the same as with a capacitor-run capacitor-start motor.

I claim:
1. An X–Y axes beam scanner comprising a pair of pulleys; a conducting endless member rotatably mounted around said pair of pulleys providing a pair of side by side parallel stretches; means mounting said pulleys so that their respective axes are mutually parallel and at an acute angle to the axes of the beam and said stretches are perpendicular to the axis of the beam; a conducting probe mounted on said endless member having one portion extending therebelow and one elongated portion extending thereabove at a further angle to the axes of rotation of said pulleys such that when said probe is positioned on one of said stretches, said elongated portion probe is perpendicular to the axis of the beam and when the probe is positioned on the other of said stretches, said elongated portion is parallel to the axis of the beam; means in conducting contact with said endless member for providing a signal for each pass of said probe through the beam; a pair of magnetic pickup means spacedly mounted adjacent said stretches, respectively, each including a magnetic circuit closable by said probe portion below said endless member to provide a trigger pulse; indicating means receiving said signal and said trigger pulse for indicating the vertical and horizontal components of the beam; and means for rotating said endless member.

2. An X–Y axes beam scanner according to claim 1 in which a magnetically openable switch means is mounted adjacent one said pulley for said endless member, means for reducing the speed of rotation of said endless member by manual control means and a magnet on the end of probe portion below said endless member opens said magnetic switch means to stop said probe out of the path of a beam being scanned.

3. An X–Y axes beam scanner according to claim 1 in which said endless member is a conducting chain mounted on sprockets.

4. An X–Y axes beam scanner according to claim 1 wherein said endless member is an electrical conducting metallic chain.

5. An X–Y axes beam scanner according to claim 1 wherein said endless member is a flexible belt having an electrical conducting member included thereon.

6. An X–Y axes beam scanner according to claim 1 in which the beam is essentially horizontal and said acute angle is 45° and said further angle is 45° whereby said probe scans the beam on a horizontal and on a vertical path.

7. An X–Y axes beam scanner according to claim 1 wherein said pickup means includes a horseshoe magnet and a coil around one leg thereof and the end of said probe below said endless member includes a magnetic counter-balance arranged to extend across the poles of said magnet.

8. An X–Y axes beam scanner according to claim 1 wherein said contact means is in conducting contact with said endless member and said indicating means is an oscilloscope.

References Cited

UNITED STATES PATENTS

| | | | |
|---|---|---|---|
| 3,207,982 | 9/1965 | Rose | 324—71 |
| 3,268,812 | 8/1966 | Meyer et al. | 324—71 |
| 3,371,274 | 2/1968 | Davey | 324—71 |

EDWARD E. KUBASIEWICZ, Primary Examiner

U.S. Cl. X.R.

343—760; 324—20; 250—49.5, 83.3